(12) United States Patent
Running et al.

(10) Patent No.: US 11,825,984 B2
(45) Date of Patent: Nov. 28, 2023

(54) PROTECTIVE LINER FOR COOKWARE

(71) Applicant: MAZMO, LLC, Mansfield, OH (US)

(72) Inventors: Madison Running, Mansfield, OH (US); Brian Running, Mansfield, OH (US)

(*) Notice: Subject to any disclaimer, the term of this patent is extended or adjusted under 35 U.S.C. 154(b) by 82 days.

(21) Appl. No.: 17/111,753

(22) Filed: Dec. 4, 2020

(65) Prior Publication Data

US 2021/0169267 A1    Jun. 10, 2021

Related U.S. Application Data

(60) Provisional application No. 62/943,368, filed on Dec. 4, 2019.

(51) Int. Cl.
*A47J 36/36*    (2006.01)
*A47J 36/06*    (2006.01)

(52) U.S. Cl.
CPC .............. *A47J 36/36* (2013.01); *A47J 36/06* (2013.01)

(58) Field of Classification Search
CPC .. A47J 36/36; A47J 36/06; A47J 36/34; A47J 36/00
USPC ........................................................ 220/729
See application file for complete search history.

(56) References Cited

U.S. PATENT DOCUMENTS

| | | | |
|---|---|---|---|
| 2011/0186584 A1* | 8/2011 | Boyden | A47J 36/00 220/573.1 |
| 2011/0283509 A1* | 11/2011 | Miller | A47J 45/10 29/428 |
| 2013/0098930 A1* | 4/2013 | Ong | A47J 45/10 29/428 |
| 2015/0265101 A1* | 9/2015 | Lemon | A47J 41/0061 220/592.24 |
| 2021/0022541 A1* | 1/2021 | Bauer | A47J 27/004 |

FOREIGN PATENT DOCUMENTS

DE    202013102958 U1 *    11/2013 .............. A47J 27/58

* cited by examiner

*Primary Examiner* — John K Fristoe, Jr.
*Assistant Examiner* — Laura E. Parker
(74) *Attorney, Agent, or Firm* — Jacob M. Ward; Ward Law Office LLC

(57) ABSTRACT

A protective liner for cookware has a main body with a bottom portion and a top portion. A rim extends laterally inwardly from the top portion of the main body, and a lip extends upwardly from the rim. A recess is disposed in the main body. The main body and the rim are configured to fit adjacent a top edge of a cookware apparatus during use. The recess is adapted to fit around a handle of the cookware apparatus, and the lip is configured to receive a lid corresponding with the top edge of the cookware apparatus. The protective liner reduces a user's risk of suffering a burn in use.

19 Claims, 5 Drawing Sheets

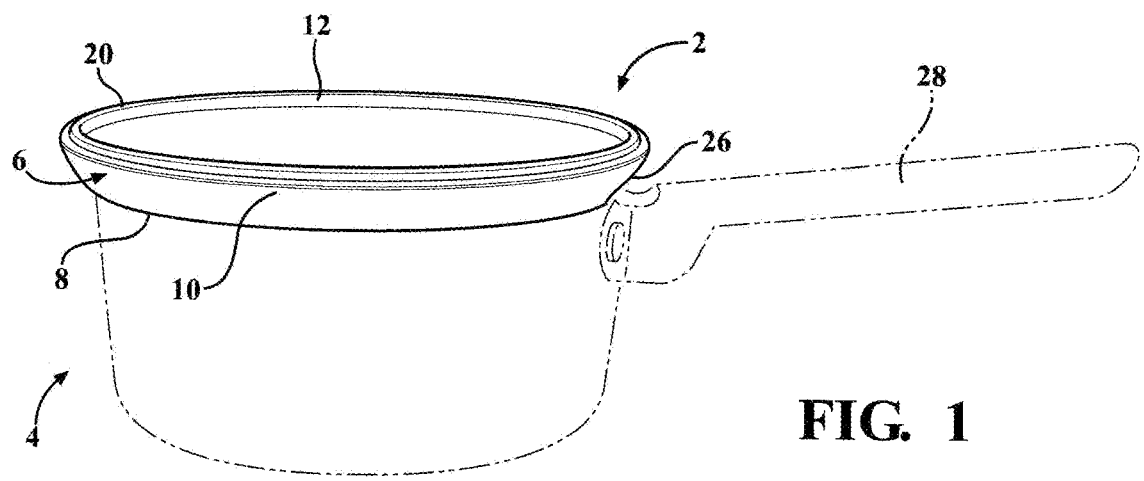
FIG. 1
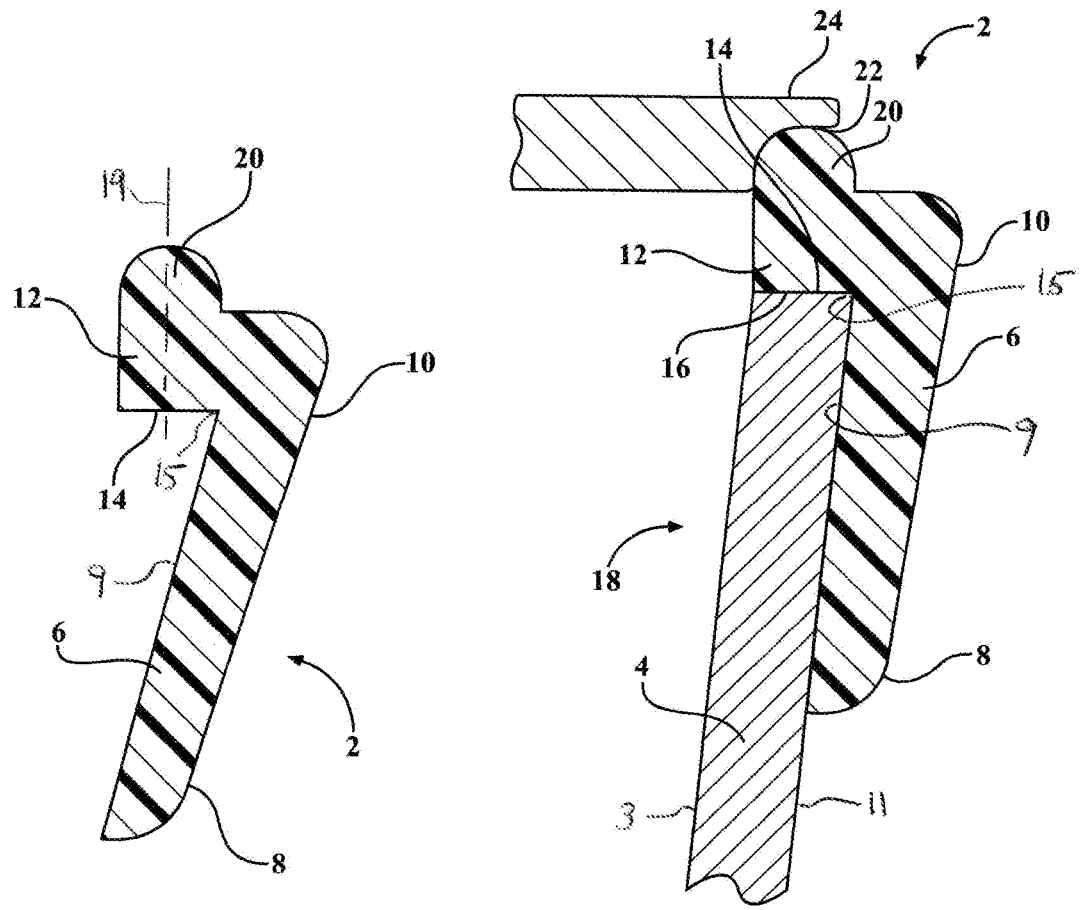
FIG. 4
FIG. 5

PROTECTIVE LINER FOR COOKWARE

CROSS-REFERENCE TO RELATED APPLICATIONS

This application claims the benefit of U.S. Provisional Application Ser. No. 62/943,368, filed on Dec. 4, 2019. The entire disclosure of the above application is hereby incorporated herein by reference.

FIELD

The present disclosure relates generally to cookware and, more particularly, to a protective liner for cookware.

BACKGROUND

Cooking is a common activity enjoyed by many people. Ranges and ovens are commonly used during meal preparation and, as such, cooking often involves extremely hot surfaces. Burn injuries are common not only from direct contact with hot stoves and ovens, but also from direct contact with hot cookware surfaces.

Various types of cookware are widely known and used in the art. For example, sauce pots, frying pans, and cast iron pans are utilized in the preparation of food. Though cookware comes in various shapes and sizes, typically cookware includes an opening defined by a top edge. This top edge is often configured to receive a lid.

When in use, the top edge of cookware may be extremely hot. This poses a risk to a user of the cookware, as it is easy to burn oneself on the exposed top edge of a pot or pan. There is a continuing need for a protective liner for cookware that militates against burn injuries. Desirably, the protective liner may be adapted to fit on cookware having variable diameters, thicknesses, and handle portions, and configured to receive a lid.

SUMMARY

In concordance with the instant disclosure, a protective liner for cookware that militates against burn injuries, is adapted to fit on cookware having variable diameters, thicknesses, and handle portions, and is configured to receive a lid, is surprisingly discovered.

In one embodiment, a protective liner has a main body having a bottom portion and a top portion. A rim extends laterally inwardly from the top portion of the main body, and a lip extends upwardly from the rim. The main body and the rim are configured to fit adjacent a top edge of a cookware apparatus in use.

In another embodiment, a protective liner has a main body having a bottom portion and a top portion. A rim is integral with and extends laterally inwardly from the top portion of the main body, and a lip is integral with and extends upwardly from the rim. A recess is disposed in the main body. The main body and the rim are configured to fit adjacent a top edge of a cookware apparatus in use. The recess is adapted to fit around a handle of the cookware apparatus.

In yet another embodiment, a protective liner has a main body having a bottom portion and a top portion. A rim is integral with and extends laterally inwardly from the top portion of the main body, and a lip is integral with and extends upwardly from the rim. A recess is disposed in the main body. the recess defined by a symmetrical, rectangular curve having a first end and a second end extending from a bottom surface of the bottom portion of the main body upwardly toward the top portion of the main body at an angle that is greater than about 20 degrees and less than about 75 degrees. The recess is adapted to fit around a handle of the cookware apparatus. The main body and the rim are configured to fit adjacent a top edge of a cookware apparatus. The main body, the rim, and the lip are fabricated from a flexible, heat resistant silicone material, and the lip is configured to receive a lid that corresponds with the top edge of the cookware apparatus.

DRAWINGS

The above, as well as other advantages of the present disclosure, will become readily apparent to those skilled in the art from the following detailed description, particularly when considered in the light of the drawings described hereafter.

FIG. 1 is a side perspective view of a protective liner in use on a cookware apparatus;

FIG. 4 is an enlarged cross-sectional side elevational view of the protective liner of FIG. 1 removed from the cookware apparatus taken at section line 5-5 in FIG. 3;

FIG. 5 is an enlarged cross-sectional side elevational view of the protective liner of FIG. 1 in use on a top edge of the cookware apparatus taken at section line 5-5 in FIG. 3;

Figure 7:
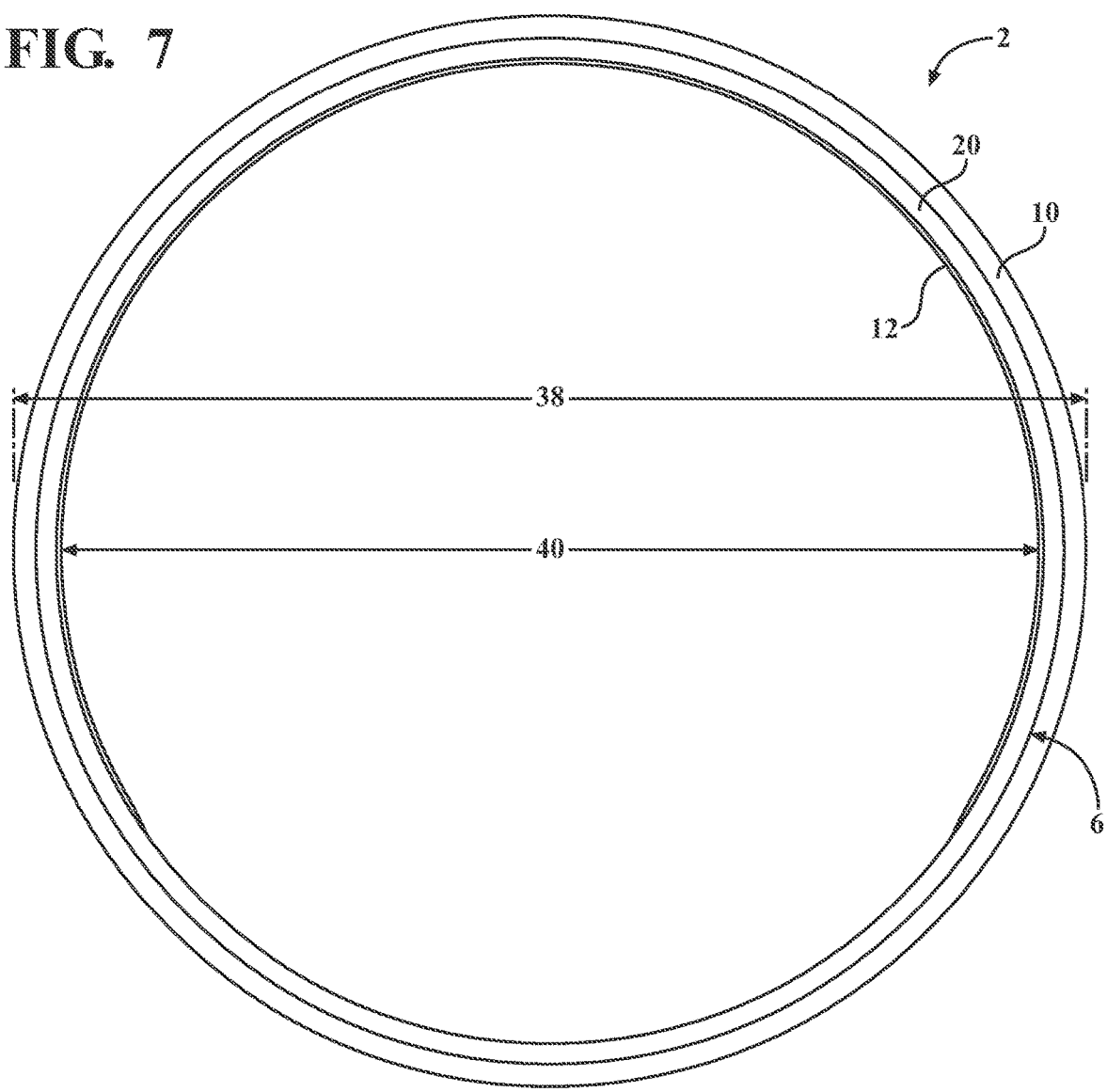
Figure 8:
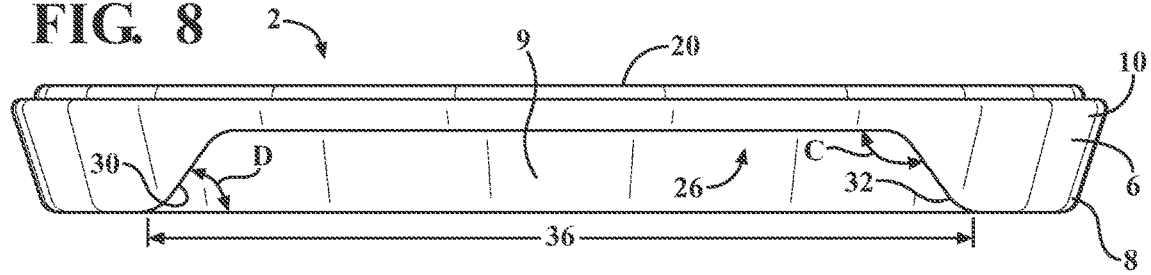
Figure 9:
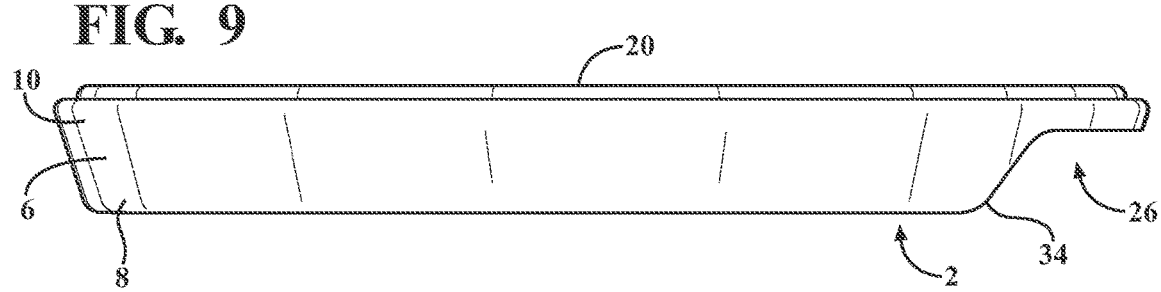
Figure 10:
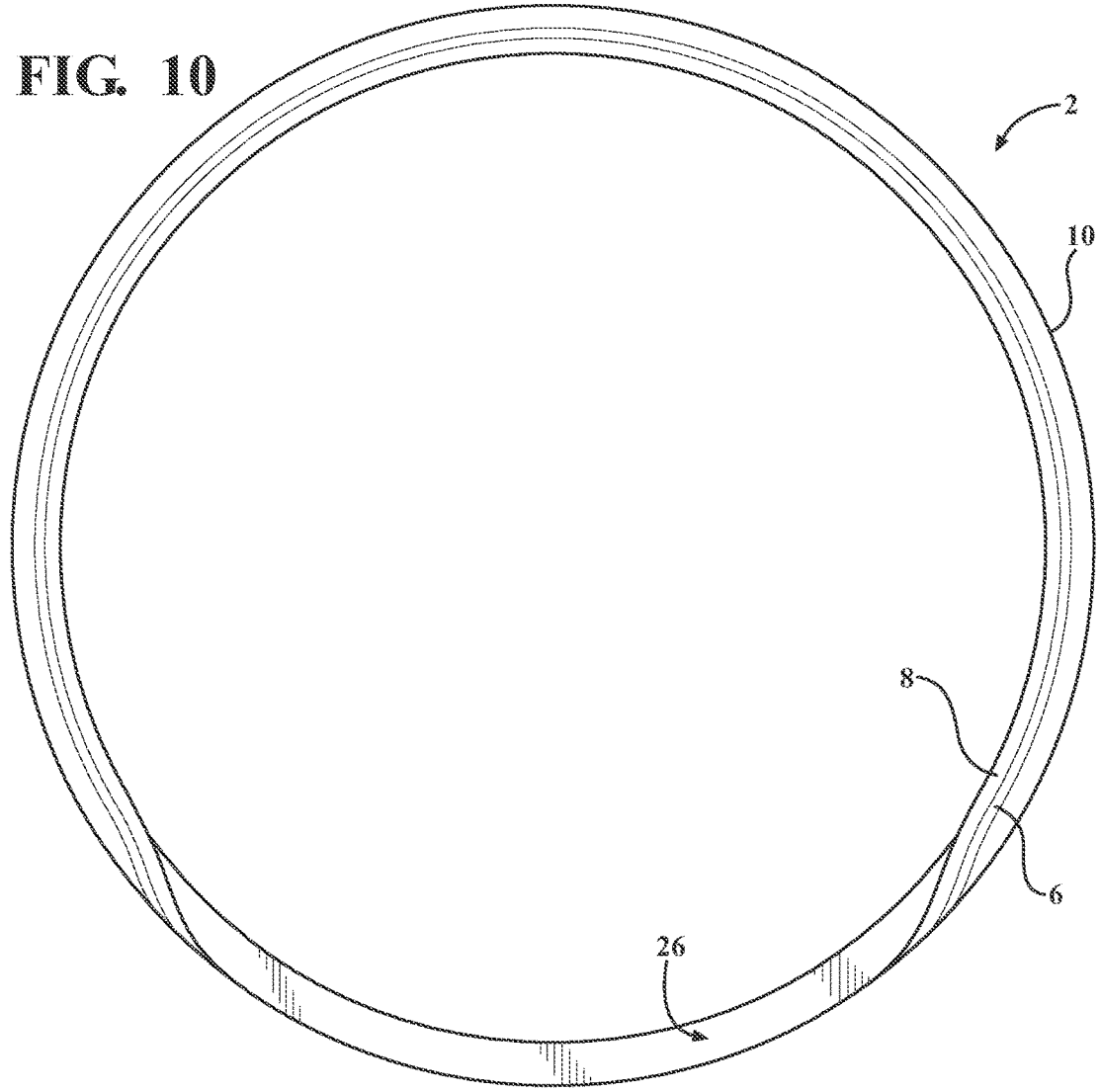
Figure 11:
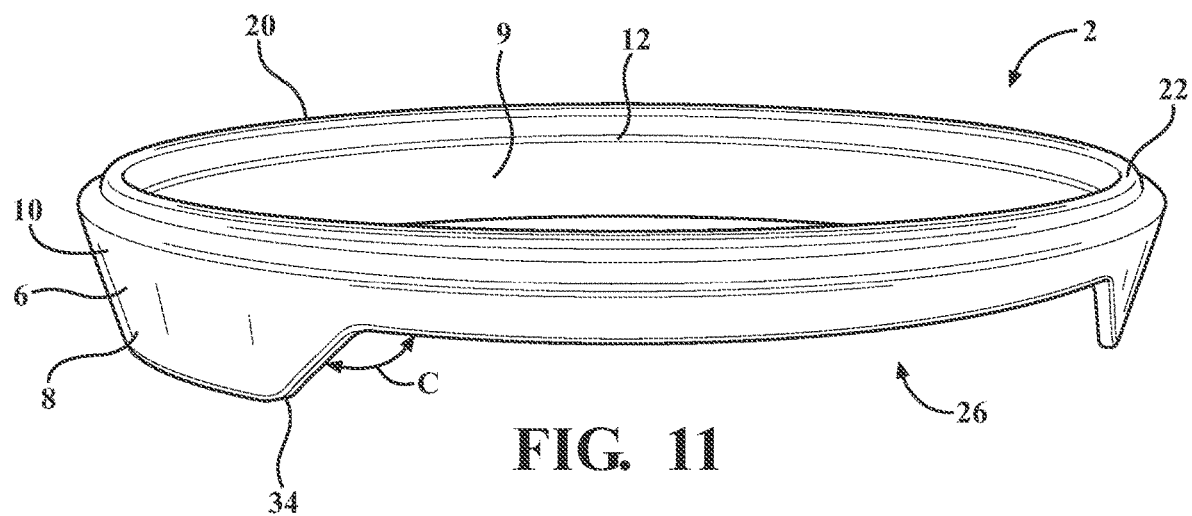

FIG. 7 a top plan view of the protective liner of FIG. 1 removed from the cookware apparatus;

FIG. 8 a rear elevational view of the protective liner of FIG. 1 removed from the cookware apparatus FIG. 9 a side elevational view of the protective liner of FIG. 1 removed from the cookware apparatus FIG. 10 is a bottom plan view of the protective liner of FIG. 1 removed from the cookware apparatus; and FIG. 11 is a rear perspective view of the protective liner of FIG. 1 removed from the cookware apparatus.

DETAILED DESCRIPTION

The following detailed description and appended drawings describe and illustrate various embodiments of the invention. The description and drawings serve to enable one skilled in the art to make and use the invention and are not intended to limit the scope of the invention in any manner.

A protective liner 2 for cookware 4 having an inner surface 3, a top surface 16, and an outer surface 11 according to various embodiments of the present disclosure is shown in FIGS. 1-11. The protective liner 2 includes a main body 6. The main body 6 has a bottom portion 8 disposed adjacent a top portion 10. An inner surface 9 of the main body 6 is adapted to form an interference fit with the outer surface 11 of the cookware 4.

As shown in FIGS. 4 and 5, a rim 12 extends laterally inwardly from the top portion 10 of the main body 6. The rim 12 may be integral with or separate from the top portion 10 of the main body 6. A bottom surface 14 of the rim 12 is adapted to abut the top surface 16 of a top edge 18 of the cookware 4. The rim 12 and the main body 6 are configured to receive and form an interference fit with the top edge 18 of the cookware 4. The inner surface 9 of the main body 6 and the bottom surface 14 of the rim 12 come together to form an inner corner 15 having an acute angle.

In one alternative embodiment (not shown), the rim 12 has a first portion that extends laterally inwardly from the top portion 10 of the main body 6 and a second portion that extends downwardly from the first portion of the rim 12 at an end opposite the top portion 10 of the main body 6. Together, the main body 6 and the first and second portions of the rim 12 form a U-shape configuration that defines a channel configured to receive the top edge 18 of the cookware 4. More specifically, the inner surface 9 of the main body 6 is adapted to form an interference fit with the outer surface 11 of the cookware 4, the bottom surface 14 of the first portion of the rim 12 abuts the top surface 16 of the top edge 18 of the cookware 4, and an inner surface of the second portion of the rim 12 abuts an inner surface of the top edge 18 of the cookware 4 forming an interference fit. The channel may expand to be disposed on the top edge 18 of the cookware 4 and then contract around the top edge 18 to secure the protective liner 2 to the cookware 4. Advantageously, the channel may be configured to be disposed on cookware 4 having varying thicknesses.

Referring now to FIGS. 2-5, a lip 20 extends upwardly from the rim 12. The lip 20 may be integral with or separate from the rim 12. In certain embodiments the lip 20 may also extend upwardly or laterally outwardly from the top portion 10 of the main body 6. The lip 20 has an outer surface 22 adapted to receive a lid 24 that corresponds with the cookware 4. In certain embodiments, the lip 20 has a semicircular or rounded shape extending upwardly from the rim 12. It should be appreciated that a skilled artisan may choose other shapes and configurations for the lip 20 within the scope of the present disclosure. A longitudinal axis 19 of the lip 20 is orthogonal to the bottom surface of the rim 12.

Figure 2:
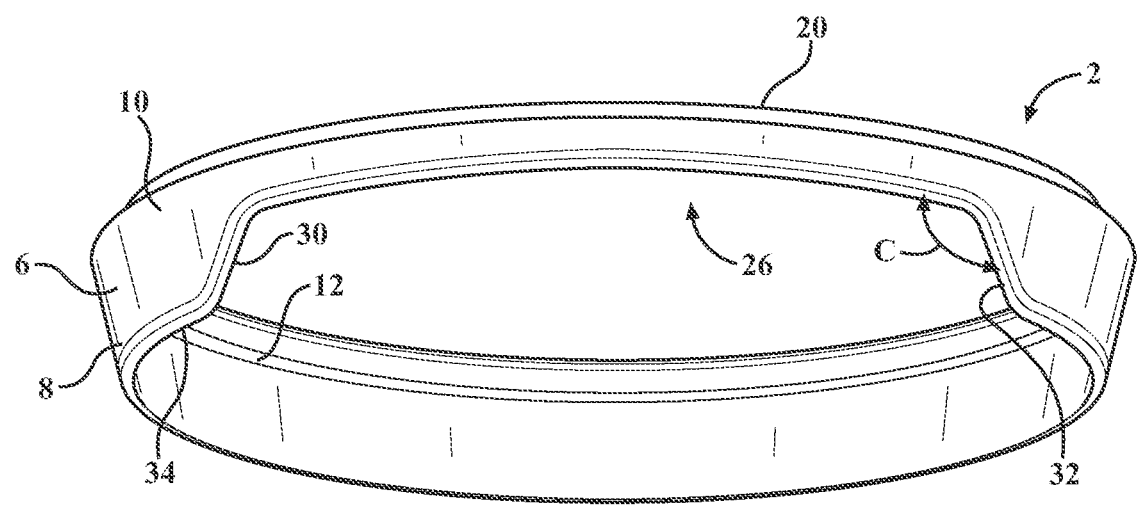
FIG. 2 is a bottom perspective view of the protective liner of FIG. 1 removed from the cookware apparatus.
Figure 3:
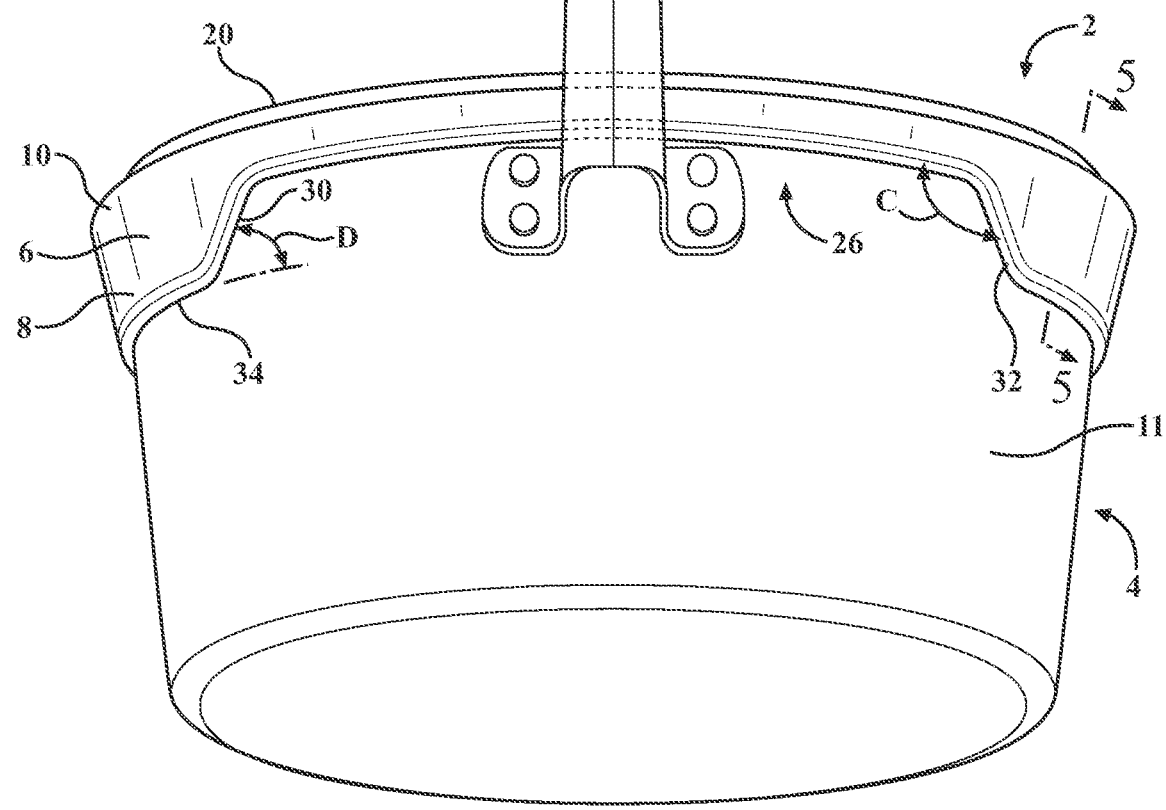
FIG. 3 is a bottom perspective view of the protective liner of FIG. 1 in use on the cookware apparatus.
Figure 6:
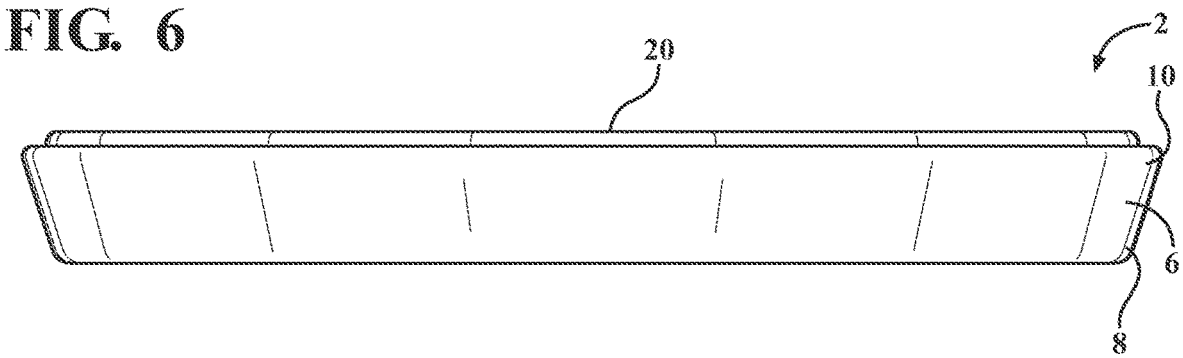
FIG. 6 is a front elevational view of the protective liner of FIG. 1 removed from the cookware apparatus.

A recess 26 is positioned in the main body 6 of the protective liner 2. As shown in FIG. 3, the recess 26 is disposed adjacent a handle 28 of the cookware 4 during operation. The recess 26 includes a first end 30 and a second end 32. The first end 30 and the second end 32 extend upwardly from a bottom surface 34 of the bottom portion 8 of the main body 6 to form a symmetrical indentation adjacent the top portion 10 of the main body 6. In certain embodiments, the recess 26 may extend into the top portion 10 of the main body 6. The recess 26 may be a rectangular curve in certain embodiments, however, any suitable shape and configuration may be chosen by a skilled artisan within the scope of the present disclosure.

With reference to FIGS. 3, 8, and 11, in certain embodiments, the first end 30 and the second end 32 extend upwardly at an angle D toward the top portion 10 of the main body 6. Likewise, in certain embodiments, the first end 30 and the second end 32 curve inwardly toward one another at an angle C. In certain preferred embodiments, angle D is between about 20 and 75 degrees, and angle C is between about 105 and 160 degrees. In a most particular embodiment, angle D is between about 50 and 75 degrees, and angle C is between about 105 and 130 degrees. Angles D and C may be any suitable size as determined by one of ordinary skill in the art.

A width 36 of the recess 26, as shown in FIG. 8, may vary according to various embodiments of the invention. In certain preferred embodiments, the width 36 is about 3.5 inches. The width 36 may be consistent in certain embodiments or varying as the first end 30 and the second end 32 extend upwardly.

In further embodiments, there may be more than one recess 26 disposed in the main body 6 of the protective liner 2 to facilitate easy application to cookware 4 having more than one handle 28.

The protective liner 2 may be fabricated from a flexible material. In certain embodiments the flexible material is a heat resistant material such as cotton, wool, rubber, silicone, or other heat-resistant polymers, as non-limiting examples. In certain preferred embodiments, the flexible material may be silicone, and in a most particular embodiment, the silicone may have a minimum elongation at break of 30%. A skilled artisan may select another heat resistant, flexible material, or a combination of heat resistant, flexible materials, as desired.

The protective liner 2 may have a predetermined shape in certain embodiments. In a preferred embodiment, the predetermined shape may be configured to coincide with the top edge 18 of the cookware 4. More particularly, the predetermined shape may be circular, however, any suitable shape may be selected by a skilled artisan within the scope of this disclosure. Alternatively, the protective liner 2 may not have a predetermined shaped in certain embodiments.

The inner surface 9 of the main body 6, the bottom surface 14 of the rim 12, and the outer surface 22 of the lip 20 may be smooth in certain preferred embodiments to facilitate an interference fit between the protective liner 2 and the cookware 4 and lid 24.

One of ordinary skill in the art may select any suitable size, thickness, height, shape and configuration for the main body 6, the rim 12, the lip 20, and the recess 26, as desired. It should be understood that various aspects including but not limited to the size, thickness, height, shape, and configuration of each of the main body 6, the rim 12, the lip 20, and the recess 26 may be uniform throughout the protective liner 2 or may vary according to different embodiments.

In one alternative embodiment, the main body 6 may not form a complete circle, such that the main body 6 has free ends (not shown). The free ends may also allow the protective liner 2 to be used on cookware 4 of varying sizes absent a flexible material capable of stretching to fit cookware 4 of varying sizes. A skilled artisan may select other suitable shapes and configurations for the main body 6, as desired.

In operation, a user may stretch the main body 6 of the protective liner 2 over the top edge 18 of the cookware 4. The flexible material stretches and then tightens around the top edge 18 of the cookware 4 to form an interference fit. More specifically, an inner surface 9 of the main body 6 forms an interference fit with the outer surface 11 adjacent the top edge 18 of the cookware 4, and the bottom surface 14 of the rim 12 forms an interference fit with the top surface 16 of the top edge 18 of the cookware, thereby securing the protective liner 2 to the cookware 4. Advantageously, the protective liner 2 can be stretched to varying degrees to facilitate a secure connection with cookware 4 having varying diameters. In certain preferred embodiments, the protective liner 2 has a diameter 38 of about 6.5 inches when not in use in order to facilitate a secure connection with cookware having a diameter between about 7.0 and 10.0 inches during use.

Additionally, the configuration of the rim 12, and more specifically, the inward, lateral extension of the rim 12 from the top section 10 of the main body 6 allows the protective liner 2 to be used with cookware 4 having variable thicknesses.

Likewise, the configuration of the lip 20 on the rim 12 facilitates use with cookware 4 and corresponding lids 24 in various sizes. The inward, lateral extension of the rim 12 positions the lip 20 directly above the top surface 16 of the top edge 18 of the cookware 4. Accordingly, the lip 20 is disposed directly adjacent to the top surface 16 where the corresponding lid 24 connects to the cookware 4 during use. In certain preferred embodiments, a diameter 40 of the lip 20 is smaller than the diameter 38 of the main body 6 to facilitate placement of the lip 20 directly above the top surface 16 of the cookware 4.

Additionally, the curved shape of the lip 20 in certain preferred embodiments facilitates a more secure fit with the lid 24 by providing a slope along which the lid 24 can be secured. The curved shape of the lip 20 also militates against the lid 24 sliding off the protective liner 2.

The recess 26 facilitates an uninterrupted interference fit between the protective liner 2 and the top edge 18 of the cookware 4, while enabling use of the protective liner 2 with cookware 4 having handles 28 that vary in shape and size.

Advantageously, if the user makes unintended contact with the top edge 18 of the cookware 4 during use, the heat resistant material of the protective liner 2 protects the user from burn injuries. Additionally, the flexible material allows for easy application and removal of the protective liner 2 in use with cookware 4.

While certain representative embodiments and details have been shown for purposes of illustrating the invention, it will be apparent to those skilled in the art that various changes may be made without departing from the scope of the disclosure, which is further described in the following appended claims.

What is claimed is:

1. A protective liner for cookware, the cookware having an inner surface, a top surface, and an outer surface, the protective liner comprising:
   a main body having a circular shape and including a bottom portion, a top portion, and an inner surface, wherein an entirety of the inner surface is configured to contact the outer surface of the cookware;
   a rim extending laterally inwardly from the top portion of the main body, the rim having a bottom surface configured to contact the top surface of the cookware, wherein the inner surface of the main body and the bottom surface of the rim come together to form an inner corner having an acute angle;
   a lip extending upwardly from the rim; and
   a recess formed in the main body, wherein the recess is configured to accommodate a handle of the cookware when the cookware includes a handle projecting from the outer surface thereof, wherein the protective liner does not contact the inner surface of the cookware.

2. The protective liner for cookware of claim 1, wherein the main body is fabricated from a flexible material.

3. The protective liner for cookware of claim 1, wherein the main body is fabricated from a heat resistant material.

4. The protective liner for cookware of claim 1, wherein the main body has a diameter of about 6.5 inches when not in use.

5. The protective liner for cookware of claim 1, wherein the top edge of the cookware apparatus has a diameter that is between about 7.0 and 10.0 inches.

6. The protective liner for cookware of claim 1, wherein the lip is configured to receive a lid.

7. The protective liner for cookware of claim 1, wherein the bottom surface of the rim is configured to contact an entirety of the top surface of the cookware.

8. The protective liner for cookware of claim 1, wherein a longitudinal axis of the lip is orthogonal to the bottom surface of the rim.

9. The protective liner for cookware of claim 1, wherein a width of a bottom portion of the lip and a width of the rim are substantially the same.

10. A protective liner for cookware, the cookware having an inner surface, a top surface, and an outer surface, the protective liner comprising:
    a main body having a circular shape and including a bottom portion, a top portion, and an inner surface, wherein an entirety of the inner surface is configured to contact the outer surface of the cookware;
    a rim integral with and extending laterally inwardly from the top portion of the main body, ti rim having a bottom surface configured to contact an entirety of the top surface of the cookware, wherein the inner surface of the main body and the bottom surface of the rim come together to form an inner corner having an acute angle;
    a lip integral with and extending upwardly from the rim, wherein a bisecting axis of the lip is parallel to a bisecting axis of the top surface of the cookware; and
    a recess formed in the main body, wherein the recess is configured to accommodate a handle of the cookware when the cookware includes a handle projecting from the outer surface thereof
    wherein the protective liner does not contact the inner surface of the cookware.

11. The protective liner for cookware of claim 10, wherein the main body, the rim, and the lip are fabricated from a heat resistant, flexible material.

12. The protective liner for cookware of claim 10, wherein the lip is configured to receive a lid that corresponds with the top surface of the cookware.

13. The protective liner for cookware of claim 10, wherein the main body has a diameter of about 6.5 inches when not in use.

14. The protective liner for cookware of claim 10, wherein the lip has a first diameter that is smaller than a second diameter of the main body in use.

15. The protective liner for cookware of claim 10, wherein the recess has a maximum width of about 3.5 inches.

16. The protective liner for cookware of claim 10, wherein a longitudinal axis of the lip is orthogonal to the bottom surface of the rim.

17. The protective liner for cookware of claim 10, wherein a width of a bottom portion of the lip and a width of the rim are substantially the same.

18. A protective liner for cookware, the cookware having an inner surface, a top surface, and an outer surface, the protective liner comprising:
    a main body having a circular shape and including a bottom portion, a top portion, and an inner surface, wherein an entirety of the inner surface is configured to contact the outer surface of the cookware;
    a rim integral with and extending laterally inwardly from the top portion of the main body, the rim having a bottom surface configured to contact an entirety of the top surface of the cookware, wherein the inner surface of the main body and the bottom surface of the rim come together to form an inner corner having an acute angle;
    a lip integral with and extending upwardly from the rim, wherein a bisecting axis of the top surface of the cookware is coincident to a bisecting axis of the lip and a width of the bottom portion of the lip and a width of the rim are substantially the same; and
    a recess formed in the main body, wherein the recess is configured to accommodate a handle of the cookware when the cookware includes a handle projecting from the outer surface thereof, and wherein the protective liner does not contact the inner surface of the cookware.

19. The protective liner for cookware of claim 18, wherein the silicone material has a minimum elongation at break of about 30%.

* * * * *